United States Patent [19]
Fukano et al.

[11] Patent Number: 5,931,384
[45] Date of Patent: Aug. 3, 1999

[54] SUCK BACK VALVE

[75] Inventors: Yoshihiro Fukano; Tetsuro Maruyama, both of Ibaraki-ken, Japan

[73] Assignee: SMC Kabushiki Kaisha, Tokyo, Japan

[21] Appl. No.: 09/037,862

[22] Filed: Mar. 10, 1998

[30] Foreign Application Priority Data

Mar. 18, 1997 [JP] Japan .................................. 9-065077

[51] Int. Cl.$^6$ .................................................. B05B 15/02
[52] U.S. Cl. ..................... 239/119; 239/106; 222/571; 251/30.02; 251/63.5; 251/331
[58] Field of Search .................................... 239/104, 106, 239/119, 583, 586; 222/571; 251/30.02, 63.5, 331

[56] References Cited

U.S. PATENT DOCUMENTS

| | | | |
|---|---|---|---|
| 3,895,748 | 7/1975 | Klingenberg | 222/571 |
| 4,394,945 | 7/1983 | Taylor, Jr. | 222/571 |
| 4,597,719 | 7/1986 | Tano | 222/571 X |
| 5,134,962 | 8/1992 | Amada et al. | 222/571 X |
| 5,423,482 | 6/1995 | Mueller et al. | 239/119 X |

FOREIGN PATENT DOCUMENTS 8-10399  3/1996  Japan .

*Primary Examiner*—Andres Kashnikow
*Assistant Examiner*—Steven J. Ganey
*Attorney, Agent, or Firm*—Oblon, Spivak McClelland, Maier & Neustadt, P.C.

[57] ABSTRACT

A suck back valve is proposed, comprising a suck back mechanism for sucking a coating liquid inside a fluid passage under a negative pressure action of a third diaphragm displaced by a pilot pressure, an ON/OFF valve for opening and closing the fluid passage under action of the same pilot pressure which is supplied to the suck back mechanism, and a fluid passage switching element for switching the pilot pressure supplied respectively to the suck back mechanism and to the ON/OFF valve.

8 Claims, 6 Drawing Sheets

SUCK BACK VALVE

BACKGROUND OF THE INVENTION

1. Field of the Invention

The present invention relates to a suck back valve in which liquid dripping, for example occurring at a supply port of a fluid passage, is prevented by sucking a predetermined amount of fluid flowing through the fluid passage by displacement of a diaphragm, yet wherein the sucked amount of fluid can be stabilized.

2. Description of the Related Art

There has hitherto been known, for example, a semiconductor wafer manufacturing process in which a suck back valve is employed. In the suck back valve, when supply of coating liquid to the semiconductor wafer is halted, there is a function for preventing so called liquid drip, wherein minute amounts of coating liquid drip from a supply port onto the semiconductor wafer.

The suck back valve according to such a conventional technique is shown in FIG. 6 and is disclosed, for example, by Japanese Utility Model Publication No. 8-10399.

Such a suck back valve 1 comprises a main valve body 5 formed with a fluid passage 4 interconnecting a fluid inlet port 2 and a fluid outlet port 3, and includes a bonnet 6 connected to an upper portion of the main valve body 5. A diaphragm 7 made up of a thick-walled portion and a thin-walled portion is disposed in the center of the fluid passage 4. A pressurized fluid supply source 13 is connected to the bonnet 6, and a pressurized fluid supply port 8, for supplying pressurized air for operating the diaphragm under a switch-over action of a directional control valve, is formed in the bonnet 6.

A piston 9 is fitted to the diaphragm 7, with a v-packing 10 installed in the piston 9 and slidable along an inner wall surface of the main valve body 5 and serving a sealing function. Further, a spring 11 which normally presses the piston in a upward direction, is disposed in the main valve body 5.

An adjusting screw 12 is disposed on the top of the bonnet 6 which, by increasing or decreasing a screw-in amount thereof, abuts against the piston 9 and adjusts a displacement amount of the piston 9, whereby the amount of coating liquid sucked by the diaphragm 7 is adjusted.

A coating liquid supply source 14, storing therein a coating liquid, is connected to the pressurized fluid inlet port 2 through a conduit 15 such as a tube, and further, between the coating liquid supply source 14 and the fluid inlet port 2, an ON/OFF valve 16, which is constructed separately from the suck back valve, is connected. The ON/OFF valve 16 performs a function of switching between a supply state, and a supply-halted state, of the coating liquid to the suck back valve 1, by energization and de-energization of the ON/OFF valve 16.

Operation of the suck back valve 1 shall now be explained in outline. In an ordinary state in which the fluid is supplied from the fluid-inlet port 2 to the fluid-outlet port 3, the piston 9 and diaphragm 7 are displaced downwardly in an integrated manner in accordance with action of the pressurized fluid supplied from the pressurized fluid supply port 8. The diaphragm 7, which is coupled to the piston 9, protrudes into the fluid passage 4 as shown in FIG. 6 by the two-dot-chain line.

At that point, in the case that the flow of coating liquid inside the fluid passage 4 is halted by a switch-over action of the ON/OFF valve 16, by halting the supply of pressurized air from the pressurized fluid supply port 8, the piston 9 and diaphragm 7 are raised in unison under action of the elastic force of the spring 11, wherein coating liquid remaining in the fluid passage 4 is sucked by a negative pressure action of the diaphragm 7, and liquid dripping at an unillustrated supply port is prevented.

Incidentally, in the suck back valve 1 according to the conventional technique, in order to adjust with high accuracy the flow amount of pressurized air supplied from the pressurized fluid supply source, a fluid pressure control device 18 is interveningly installed between the pressurized fluid supply source 13 and the pressurized fluid supply port 8 through a conduit 17 such as a tube. The fluid pressure control device 18 is formed separately from the suck back valve 1, and along with preventing pressure variations in the pressurized air supplied to the fluid supply port 8 of the suck back valve 1, also serves a function for controlling the flow amount of pressurized air supplied to the pressurized fluid supply port 8.

Notwithstanding, when using the suck back valve 1 in accordance with the conventional technique, apart from the pressurized fluid supply source 13 which operates the diaphragm 7, a driving device 19 for switching between ON and OFF states of the ON/OFF valve 16 becomes necessary, wherein, along with added complexity of pipe connecting operations between the ON/OFF valve 16 and the driving device 19, there is the drawback of soaring costs.

Further, in the suck back valve according to the conventional technique, pipe connecting operations between the suck back valve 1 and the fluid pressure control device 18, as well as between the suck back valve 1 and the ON/OFF valve 16 are necessary, resulting in added complexity. In addition, respective dedicated spaces for installation of the fluid pressure control device 18, the ON/OFF valve 16 and the driving device 19, apart from the suck back valve 1 itself, are needed, and there is a disadvantage that the installation space for the overall apparatus increases.

Furthermore, because of the pipes connected between the suck back valve 1 and the fluid pressure control device 18, flow passage resistance increases, with the drawback that response accuracy (responsiveness) of the diaphragm 7 is deteriorated.

SUMMARY OF THE INVENTION

A general object of the present invention is to provide a suck back valve in which pressurized fluid (pilot pressure) supplied respectively to a suck back mechanism and to an ON/OFF valve can be made common, wherein by performing respective switching controls of supply of pressurized fluid to the suck back mechanism and to the ON/OFF valve, pipe connecting operations become unnecessary and the production cost is reduced.

A main object of the present invention is to provide a suck back valve in which, by making unnecessary a driving device for causing ON/OFF operations of an ON/OFF valve, installation space for the apparatus can be minimized.

Another object of the present invention is to provide a suck back valve enabling fluid passage resistance to be reduced, and in which the response accuracy of a diaphragm can be improved.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
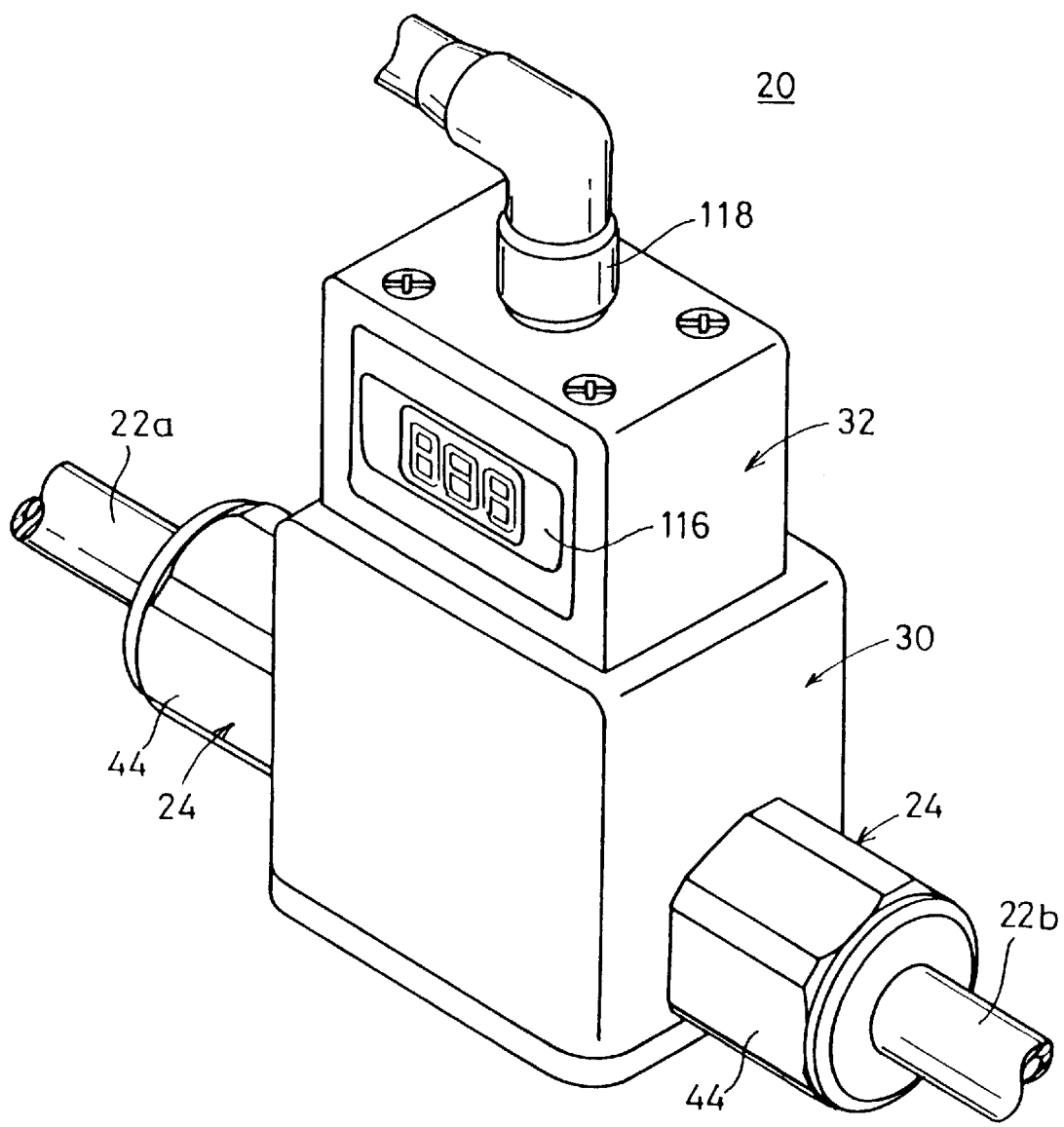
FIG. 1 is a perspective view of a suck back valve in accordance with an embodiment of the present invention.

Referring to FIG. 1, reference numeral 20 indicates a suck back valve according to an embodiment of the present invention. The suck back valve 20 is constructed from a coupling 24 to which a pair of tubes 22a, 22b are detachably connected at a fixed interval separation, a valve driving device 30 disposed on an upper part of the coupling 24 and having disposed internally an ON/OFF valve 26 and a suck back mechanism 28 (see FIG. 2), and a controller 32 for controlling switching of a pressurized fluid supplied respectively to the ON/OFF valve 26 and to the suck back mechanism 28, along with controlling the pressure (pilot pressure) of a pressurized fluid supplied to the ON/OFF valve 26 and to the suck back mechanism 28. Further, as shown by FIG. 1, the coupling 24, the valve driving device 30 and the controller 32 are assembled together integrally.

Figure 2:
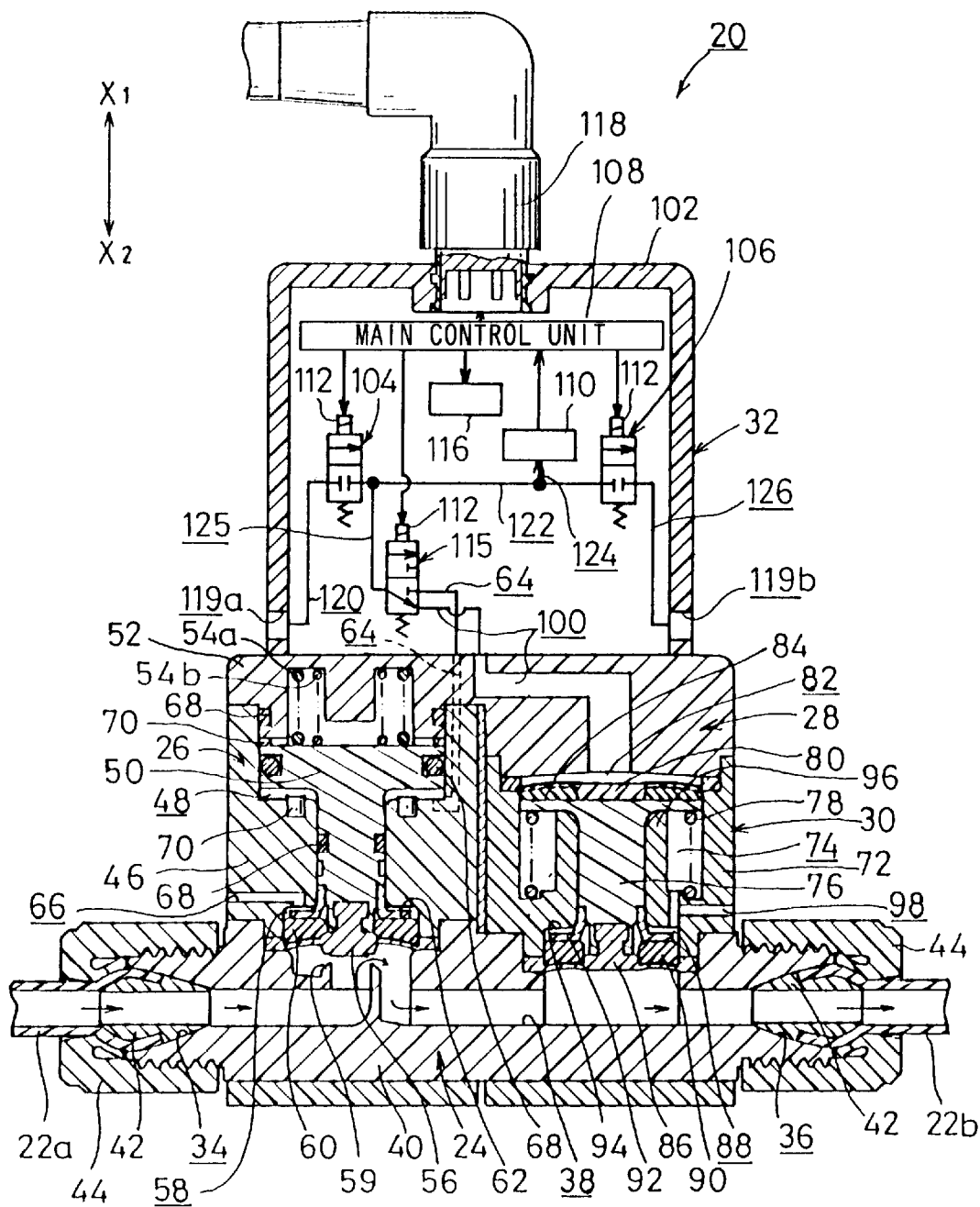
FIG. 2 is a vertical cross-sectional view of the suck back valve shown in FIG. 1.

As shown in FIG. 2, the coupling 24 includes a coupling body 40 having a first port 34 formed in one end, and a second port 36 formed in the other end thereof, and having disposed therein a fluid passage 38 intercommunicating the first port 34 and the second port 36, inner members 42 coupled respectively to the first port 34 and the second port 36 and being inserted into the openings of tubes 22a, 22b, and lock nuts 44 for maintaining fluid-tight the positions of the tubes 22a, 22b by threadedly inserting the lock nuts onto screw threads cut into ends of the coupling body 40.

An ON/OFF valve 26 is arranged on an upper part of the coupling 24 in proximity to the first port 34, the ON/OFF valve 26 having a first valve body 46 integrally connected with the coupling body 40, a piston 50 displaceable in directions of arrows $X_1$ and $X_2$ along a cylinder chamber formed inside the first valve body 46, and a cover member 52 for hermetically blocking the cylinder chamber 48. The cover member 52 extends to and over the suck back mechanism 28.

A pair of different diameter spring elements 54a, 54b are interveningly disposed between the piston 50 and the cover member 52, wherein the piston 50 is normally biased downward (in the direction of arrow $X_2$) under an elastic force of the spring elements 54a, 54b.

A first diaphragm chamber 58 which is blocked by a first diaphragm 56 is formed at a lower end of the piston 50, wherein the first diaphragm 56 is connected to the lower end of the piston 50 and disposed for displacement integrally with the piston 50. In this case, the first diaphragm 56 performs a function for opening and closing the fluid passage 38 by separation thereof from a seat 59 formed in the coupling body 40, and further by seating thereof onto the seat 59. Accordingly, under an opening/closing action of the ON/OFF valve 26, a pressurized fluid which flows through the fluid passage 38 (for example, a coating liquid) is switched between a supply state and a supply-halted state.

Further, a ring-shaped cushioning member 60 for protecting a thin-walled portion of the first diaphragm 56 is disposed on an upper surface part of the first diaphragm 56, the cushioning member 60 being supported by a cross-sectionally L-shaped support member 62 connected to a lower end of the piston 50.

A first pilot passage 64 for intercommunicating a fluid passage switching element (described later) and a cylinder chamber 48 of the ON/OFF valve 26 is formed in the first valve body 46. In this case, by supplying a pressurized fluid to the interior of the cylinder chamber 48 through the first pilot passage 64 under a switching action of the fluid passage switching element, the piston 50 is raised in opposition to the elastic force of spring elements 54a, 54b. Accordingly, by separating the first diaphragm 56 a predetermined distance from the seat 59, the fluid passage 38 is opened, wherein the coating liquid flows from the first port 34 toward the second port 36.

Further, a passage 66 for communicating the first diaphragm chamber 58 with atmosphere is formed in the first valve body 46, wherein by discharging air inside the first diaphragm chamber 58 through the passage 66, the diaphragm 56 can be smoothly operated. Moreover, reference numeral 68 indicates respective seals for maintaining airtightness of the cylinder chamber 48, and reference numeral 70 indicates a cushioning member abutting the piston 50 and serving a cushioning function.

A suck back mechanism 28 is disposed on an upper part of the coupling body 24 in proximity to the second port 36. The suck back mechanism 28 comprises a second valve body 72 connected integrally with the coupling body 40 and the first valve body 46, and a stem 76 displaceable in directions of arrows $X_1$ and $X_2$ along a chamber 74 formed in the second valve body 72. Inside the chamber 74, a spring element 78 is arranged, which normally biases the stem 76 upwardly (in the direction of arrow $X_1$) by an elastic force generated through contact with a flange of the stem 76.

A second diaphragm 80 extends from an upper part of the stem 76, and is coupled to an upper surface of the stem 76, wherein by supplying a pilot pressure upwardly of the second diaphragm 80, a second diaphragm chamber (pilot chamber) 82 is formed which acts on the second diaphragm 80. In this case, a cushioning member 84 which is formed, for example, from a rubber material or the like is interveningly disposed between a thin-walled portion of the second diaphragm 80 and the stem 76.

Figure 4:
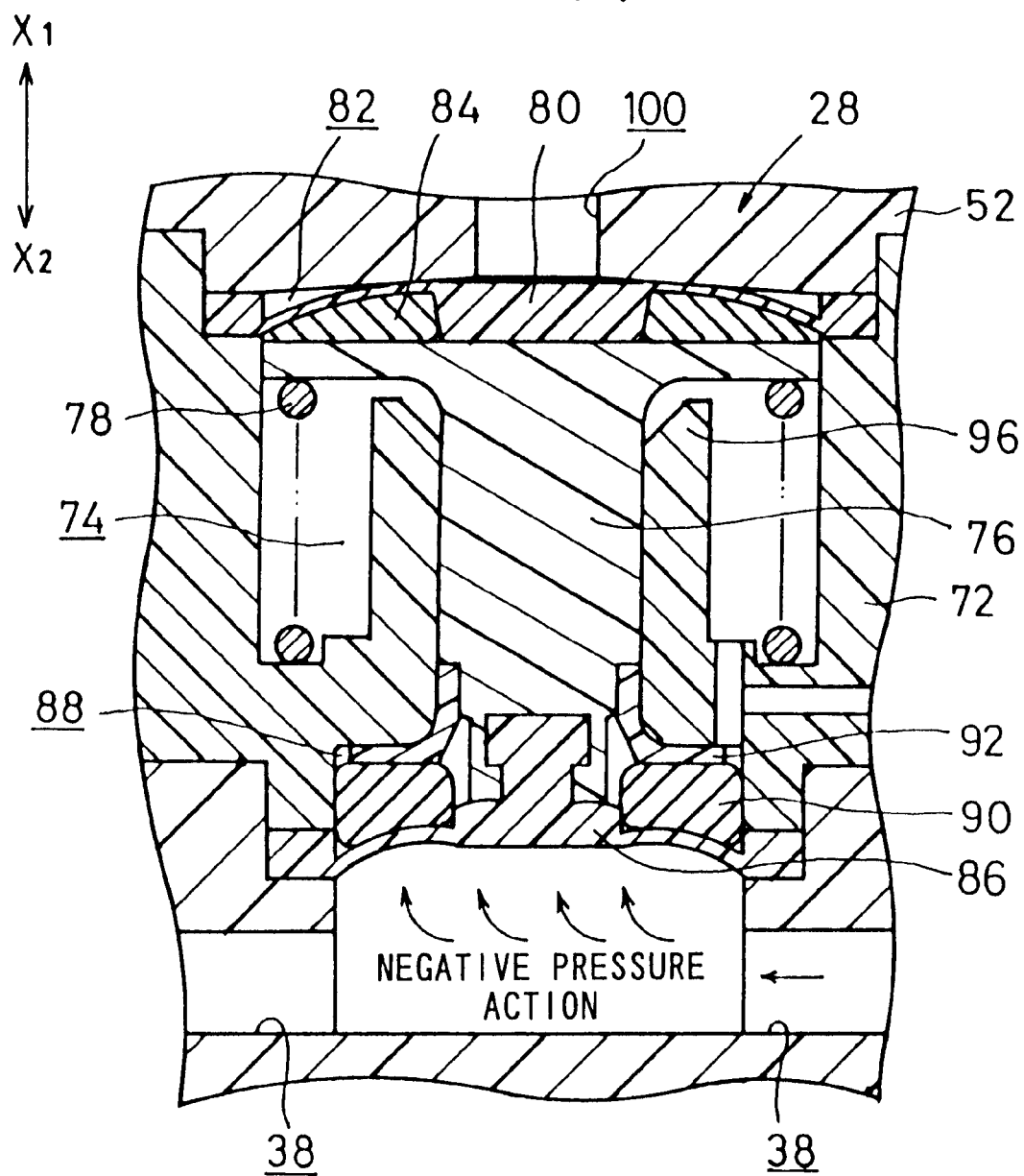
FIG. 4 is a partial vertical cross-sectional view showing operation of a diaphragm which makes up the suck back valve.

On the other hand, a third diaphragm chamber 88 blocked by a third diaphragm 86 is formed at a lower end of the stem 76 (see FIG. 4). The diaphragm 86 is connected to the stem 76 and is disposed for displacement integrally with the stem 76.

A ring-shaped cushioning member 90 for protecting a thin-walled portion of the third diaphragm 86 is disposed on an upper surface part of the third diaphragm 86, the cushioning member 90 being supported by a cross-sectionally L-shaped support member 92 connected to a lower end of the stem 76. Moreover, a displacement amount of the stem 76 in the direction of arrow $X_1$ is regulated by abutment of the support member 92 with an annular step 92 of the second valve body 72, whereas the displacement amount of the stem 76 in the direction of arrow $X_2$ is regulated by abutment of the flange of the stem 76 with a boss 96 of the second valve body 72.

A passage 98 for communicating the third diaphragm chamber 88 to atmosphere is formed in the second valve body 72, whereas a second pilot passage 100 for supplying a pilot pressure to the second diaphragm chamber 82 is formed in the cover member 52.

The controller 32 includes a bonnet 102 which is assembled integrally with the first valve body 46 and a second valve body 72 which make up the valve driving device 30, wherein a pressurized fluid supply port 119a and a pressurized fluid discharge port 119b are formed in the bonnet.

Inside the bonnet 102 are arranged a first electromagnetic valve 104 functioning as a supply valve and controlling a pilot pressure which is supplied respectively to the cylinder chamber 48 of the ON/OFF valve 26 and to the second diaphragm chamber 82, a second electromagnetic valve 106 functioning as a discharge valve by discharging to the outside a pressurized fluid supplied to the first electromagnetic valve 104, and a pressure sensor 110 for detecting a pilot pressure supplied to the first electromagnetic valve 104 and outputting a detection signal thereof to the main control unit 108.

The first electromagnetic valve 104 and the second electromagnetic valve 106, respectively, are normally closed type valves, wherein by outputting respective current signals from the main control unit 108 to electromagnetic coils 112 of the first and second electromagnetic valves 104 and 106, unillustrated valve bodies therein are drawn in the direction of arrow $X_1$, putting the electromagnetic valves 104 and 106 respectively in an ON state.

Furthermore, a fluid passage switching element 115, for switching the supply of pressurized fluid output from the first electromagnetic valve 104 between the cylinder chamber 48 of the ON/OFF valve 26 and the second diaphragm chamber 82, is disposed inside the bonnet 102. The fluid passage switching element 115 is constituted substantially by a three-port electromagnetic valve, wherein by outputting electrical signals from the main control unit 108 to the electromagnetic coil 112 thereof, switching between OFF and ON states is accomplished.

More specifically, when the fluid passage switching element 115 is in an ON state, the pilot pressure output from the first electromagnetic valve 104 is supplied to the cylinder chamber 48 of the ON/OFF valve 26 through the first pilot passage 64, whereas when the fluid passage switching element 115 is in an OFF state, the pilot pressure output from the first electromagnetic valve 104 is supplied to the second diaphragm chamber 82 through the second pilot passage 100.

A pressure value or the like detected by the pressure sensor 110 is displayed on an LED display device 116 and, as needed, set pressure values which are set by an unillustrated key input device through a connector 118 may also be displayed on the LED display device 116.

Moreover, an unillustrated MPU (microprocessor unit) which functions as various means for performing control, evaluation, processing, calculation and memory storage, is disposed in the main control unit 108. By energizing and de-energizing the first electromagnetic valve 104 and the second electromagnetic valve 106 in accordance with control signals issued from the MPU, the pilot pressures (flow amounts) supplied respectively to the cylinder chamber 48 of the ON/OFF valve 26 and to the second diaphragm chamber 82 of the suck back mechanism 28 are controlled (refer to FIGS. 5A and 5B).

Further, a first passage 120 establishing communication between a pressurized fluid supply port 119a and the first electromagnetic valve 104, a second passage 122 establishing communication between the first electromagnetic valve 104 and the second electromagnetic valve 106, and a third passage 124 branching from the second passage 122 for introducing a pilot pressure to the pressure sensor 110, are formed inside the bonnet 102.

Furthermore, a fourth passage 125 branching from the second passage 122 and establishing communication between the first electromagnetic valve 104 and the fluid passage switching element 115, a first pilot passage 64 connected to the fluid passage switching element 115 for supplying a pilot pressure to a cylinder chamber 48 of the ON/OFF valve, a second pilot passage 100 connected to the fluid passage switching element 115 for supplying a pilot pressure to the second diaphragm chamber 82, and a fifth passage 126 establishing communication between the second electromagnetic valve 106 and a pressurized fluid discharge port 119b, are disposed inside the bonnet 102.

In this case, when an electrical control signal is supplied from the main control unit 108 to the electromagnetic coil 112 of the first electromagnetic valve 104, an unillustrated valve body therein is displaced and the first electromagnetic valve assumes an ON state, whereby the first passage 120, the second passage 122 and the fourth passage 125 are placed in mutual communication. Accordingly, pressurized fluid (pilot pressure) which is supplied from the pressurized fluid supply port 119a is supplied to the fluid passage switching element 115 via the first passage 120, the second passage 122 and the fourth passage 125.

On the other hand, when an electrical signal is supplied from the main control unit 108 to the electromagnetic coil 112 of the second electromagnetic valve 106, an unillustrated valve body therein is displaced and the second electromagnetic valve 106 assumes an ON state, whereby the second passage 122 and the fifth passage 126 are placed in communication. Accordingly, pressurized fluid (pilot pressure) inside the second diaphragm chamber 82 is discharged to atmosphere passing through the fifth passage 126 and the pressurized fluid discharge port 119b.

Figure 3:
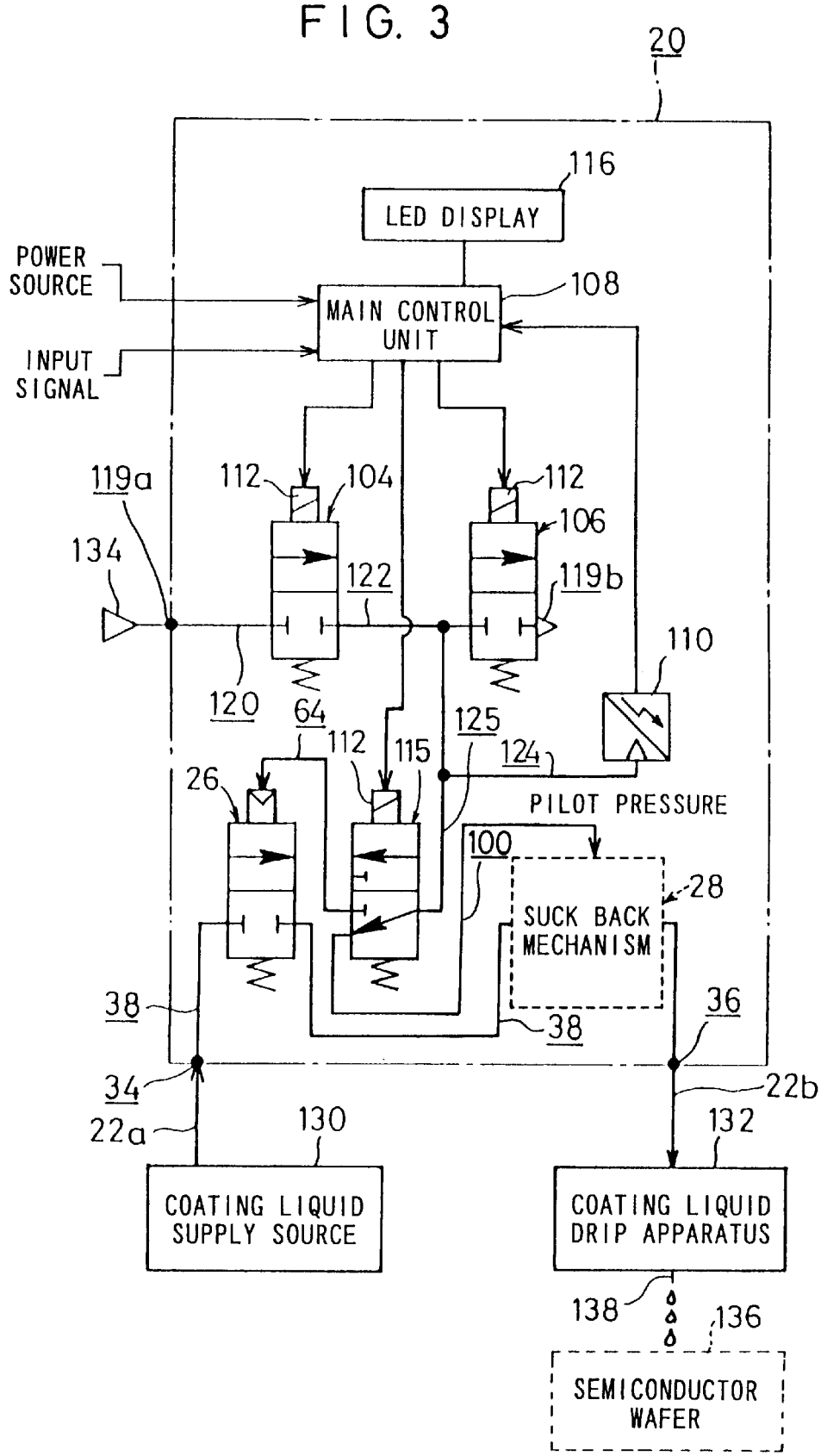
FIG. 3 is a view of a circuit structure of the suck back valve of FIG. 1.

The suck back valve 20 in accordance with the embodiment of the present invention is basically constructed as described above. Next, with reference to the circuit structure diagram shown in FIG. 3, an explanation shall be given of the operations and effects thereof.

First, a coating liquid supply source 130 storing therein a coating liquid is connected to tube 22a which communicates with the first port 34 of the suck back valve 20, whereas a coating liquid drip apparatus 132 having disposed thereon a nozzle 138 from which a coating liquid is dripped toward a semiconductor wafer 136 is connected to tube 22b which communicates with the second port 36. In addition, a pressurized fluid supply source 134 is connected to the pressurized fluid supply port 119a.

After completion of the above preparatory measures, the pressurized fluid supply source 134 is energized and a pressurized fluid is introduced to the pressurized fluid supply port 119a, and in addition an input signal is input to the main control unit 108 through an unillustrated input means. The main control unit 108 issues an energizing signal only to the first electromagnetic valve 104 based on the input signal, placing the first electromagnetic in an ON state. At this time, the second electromagnetic valve 106 and the fluid passage switching element 115 respectively are de-energized and in an OFF state.

The pressurized fluid (pilot pressure) introduced from the pressurized fluid supply port 119a is supplied to the second diaphragm chamber 82 via mutually intercommunicating first passage 120, second passage 122, fourth passage 125 and the second pilot passage 100. Under action of the pilot pressure supplied to the second diaphragm chamber 82, the second diaphragm 80 is displaced, pressing the stem 76 in the direction of arrow $X_2$. As a result, the third diaphragm 86 which is connected to a lower end of the stem 76 is displaced, attaining the condition shown by FIG. 2.

Moreover, the pilot pressure supplied to the second diaphragm chamber 82 is introduced to the pressure sensor 110 through the third passage 24, and a detection signal output by the pressure sensor 110 is input to the main control unit 108, thus performing feedback control. Further, as for the pilot pressure supplied to the second diaphragm chamber 82, the flow amount of the pressurized fluid (pilot pressure) is controlled by respectively energizing and de-energizing the first electromagnetic valve 104 and the second electromagnetic valve 106 in accordance with control signals issued from an unillustrated MPU (see FIG. 5A).

Figure 5:
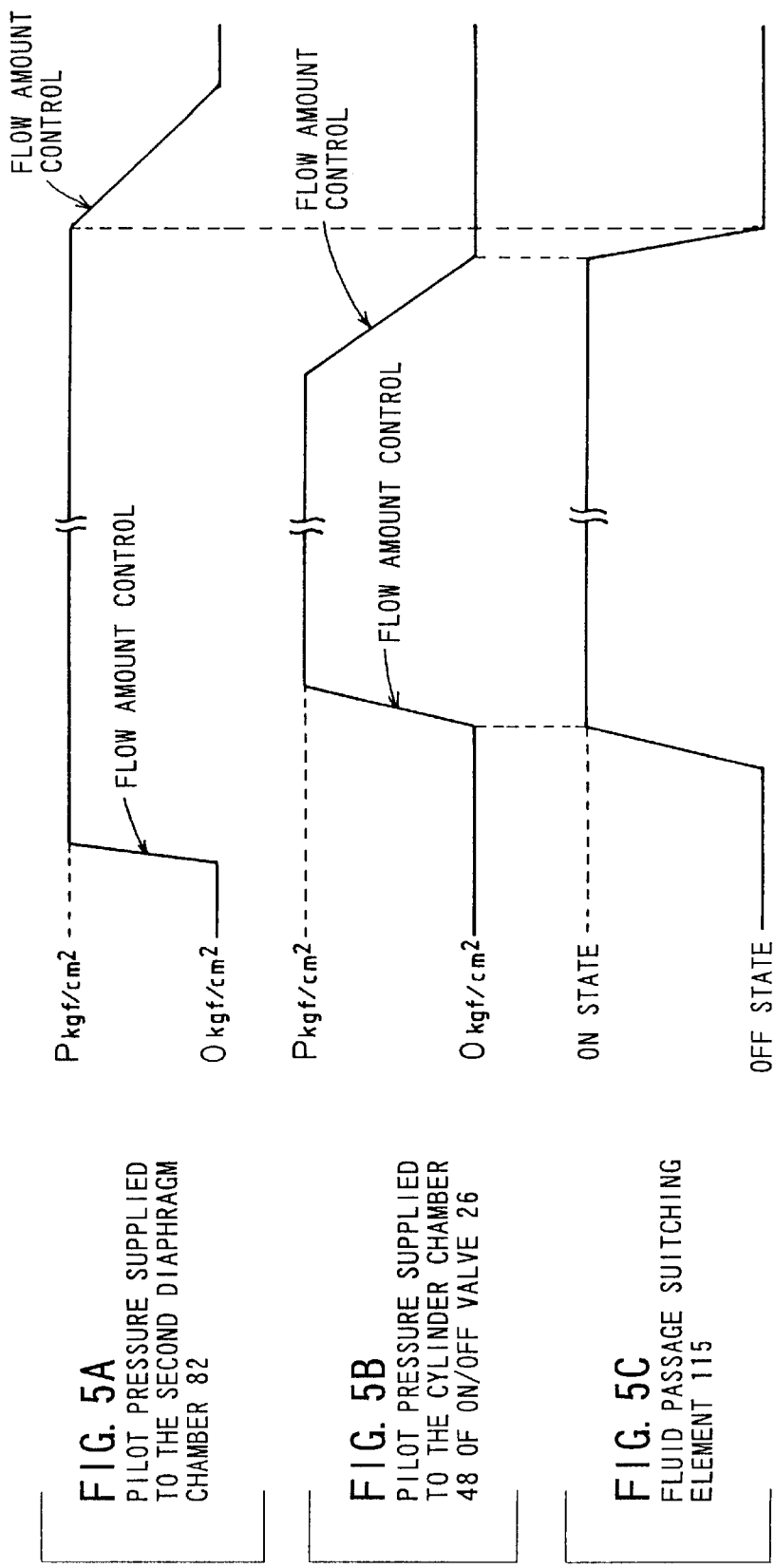
FIGS. 5A to 5C are time charts for explaining operation of the suck back valve.
Figure 6:
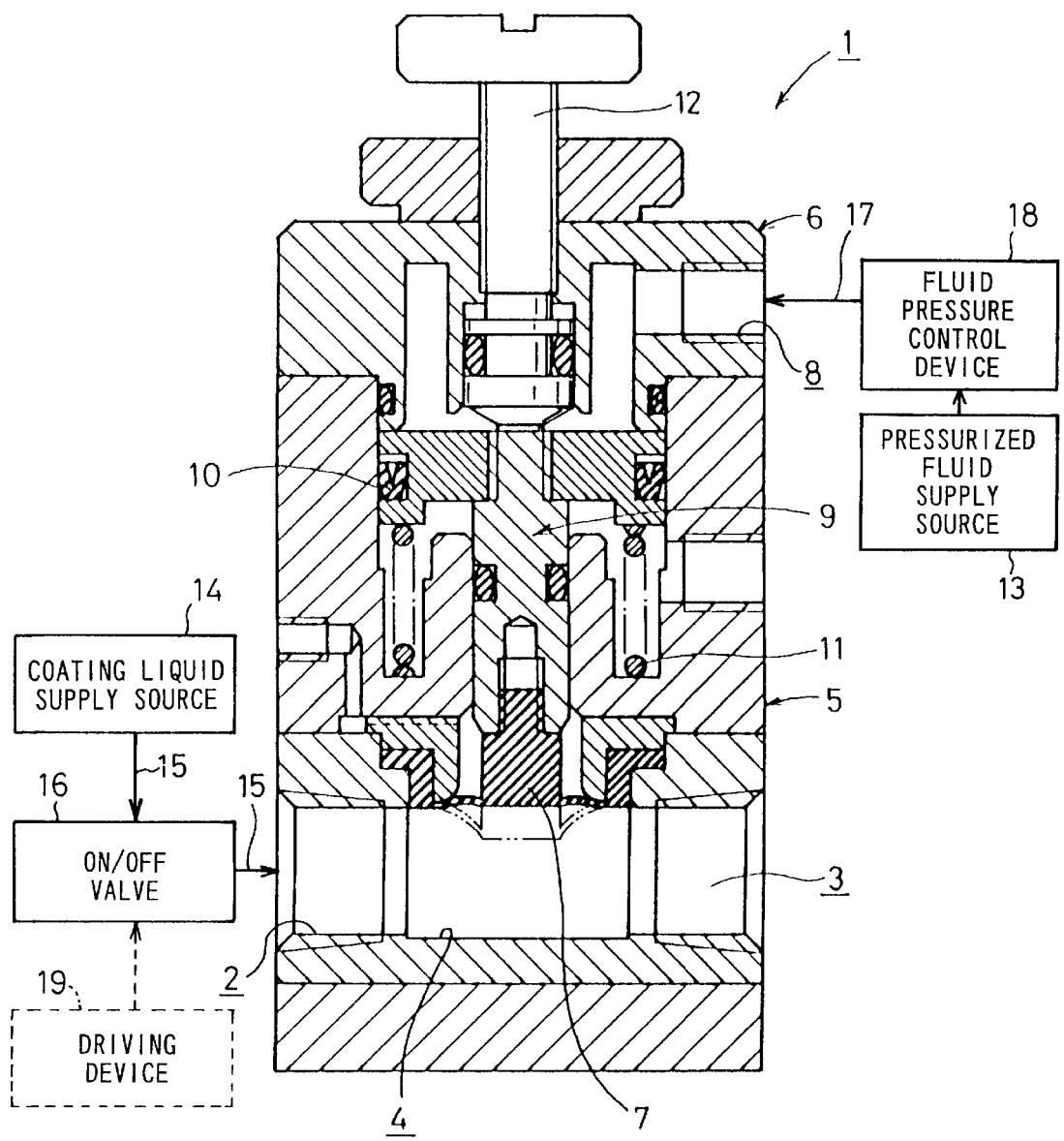
FIG. 6 is a vertical cross-sectional view of a suck back valve in accordance with the conventional technique.

In this manner, in a state in which the second diaphragm 80 is pressed in the direction of arrow $X_2$ under action of the pilot pressure supplied to the second diaphragm chamber 82, the main control unit 108 issues an energizing signal to the fluid passage switching element 115, whereby the fluid passage switching element 115 assumes an ON state (see FIG. 5C). As a result, under a switching action of the fluid passage switching element 115, supply of pilot pressure is switched from the second diaphragm chamber 82 to the cylinder chamber 48 of the ON/OFF valve 48.

More specifically, a pressurized fluid (pilot pressure) which is introduced from the pressurized fluid supply port 119a is supplied to the cylinder chamber 48 of the ON/OFF valve 26 via mutually intercommunicating first passage 120, second passage 122, fourth passage 125 and the first pilot passage 64. Further, as for the pilot pressure supplied to the cylinder 48 of the ON/OFF valve 26, the flow amount of pressurized fluid is controlled by respectively energizing and de-energizing the first electromagnetic valve 104 and the second electromagnetic valve 106 in accordance with control signals issued from the unillustrated MPU (see FIG. 5B).

The pressurized fluid (pilot pressure) introduced to the cylinder chamber 48 displaces the piston 50 in the direction of arrow $X_1$ in opposition to the elastic force of spring elements 54a, 54b. Accordingly, the first diaphragm 56 connected to the piston 50 separates away from the seat 59, wherein the ON/OFF valve 26 assumes an ON state. At that time, the coating liquid supplied from the coating liquid supply source 130 flows along the fluid passage 38 and coating liquid is dripped onto the semiconductor wafer 136 through the nozzle 138 of the coating liquid drip apparatus 132. As a result, a coating layer (not shown) having a desired thickness is formed on the semiconductor wafer 136.

Moreover, in the case that the fluid passage switching element 115 switches from an ON state to an OFF state, since the second pilot passage 100 is in a blocked-off state, pressurized fluid (pilot pressure) supplied to the second diaphragm chamber 82 is not discharged to the outside, but rather a predetermined pressure value thereof (Pkgf/cm$^2$) is maintained (see FIG. 5A).

After a predetermined amount of coating liquid has been applied to the semiconductor wafer 136 via the nozzle 138 of the coating liquid drip apparatus 132, the pilot pressure supplied to the cylinder chamber 48 of the ON/OFF valve 26 is reduced by respectively energizing and de-energizing the first electromagnetic valve 104 and the second electromagnetic valve 106 in accordance with control signals output from the unillustrated MPU of the main control unit 108, whereby the ON/OFF valve 26 is placed in an OFF state.

More specifically, by reducing the pilot pressure supplied to the cylinder chamber of the ON/OFF valve 26 to zero, the piston 50 displaces in the direction of arrow $X_2$ under action of the elastic force of spring elements 54a, 54b, and the diaphragm 56 is seated onto the seat 59.

Accordingly, by placing the ON/OFF valve 26 in an OFF state and interrupting the fluid passage 38, supply of coating liquid with respect to the semiconductor wafer 136 is halted, and the dripping state of coating liquid onto the semiconductor wafer 136 from the nozzle 138 of the coating liquid drip apparatus is suspended. In this case, because coating liquid immediately preceding that which has dripped onto the semiconductor wafer 136 remains inside the nozzle 138 of the coating liquid drip apparatus 132, there is a fear that unwanted liquid dripping may occur.

At that point, the main control unit 108 issues a de-energizing signal to the first electromagnetic valve 104, placing the first electromagnetic valve in an OFF state, while simultaneously issuing an energizing signal to the second electromagnetic valve 106, placing the second electromagnetic valve 106 in an ON state. Further, simultaneously, the main control unit 108 issues a de-energizing signal to the fluid passage switching element 115, placing the fluid passage switching element 115 in an OFF state.

Accordingly, by switching of the fluid passage switching element 115 from an ON state to an OFF state, the fourth passage 125 and second pilot passage 100 become intercommunicated, and the pressurized fluid (pilot pressure) maintained inside the second diaphragm chamber 82 is discharged to atmosphere from the pressurized fluid discharge port 119b, by way of mutually intercommunicating second pilot passage 100, fourth passage 125, second passage 122 and the fifth passage 126. At that time, the second diaphragm 80 raises in the direction of arrow $X_1$ under action of the elastic force of spring element 78, reaching the condition shown in FIG. 4.

More specifically, the second diaphragm 80 is raised, and by integral displacement of the third diaphragm 86 via the stem 76 in the direction of arrow $X_1$, a negative pressure effect is generated. At that time, a predetermined amount of coating liquid inside the fluid passage 38 is drawn along the direction of the arrows in FIG. 4. As a result, a predetermined amount of coating liquid which remains inside the nozzle 138 of the coating liquid drip apparatus 132 is returned toward the side of the suck back valve 20, whereby unwanted dripping of liquid onto the semiconductor wafer 136 can be prevented.

Moreover, by once again issuing an energizing signal to the fluid passage switching element 115 and putting the ON/OFF valve 26 in an ON state, while simultaneously issuing from the main control unit 108 an energizing signal to the first electromagnetic valve 104, placing it in an ON state, and issuing a de-energizing signal to the second electromagnetic valve 106, placing it in an OFF state, the condition of FIG. 1 is reached, wherein dripping of coating liquid onto the semiconductor wafer 136 is reinitiated.

In the present embodiment, pressurized fluids (pilot pressure) supplied respectively to the suck back mechanism 28 and to the ON/OFF valve 26 are made common, and because a switch-over control is handled via the fluid passage switching element 115, in contradistinction to the conventional technique, a driver device for driving the ON/OFF valve 26 becomes unnecessary. As a result, further miniaturization of the overall apparatus is made possible, together with a reduction in production costs.

Further, the coupling 24, the ON/OFF valve 26, the suck back mechanism 28 and the controller 32, respectively, are assembled integrally so that, in contradistinction to the conventional technique, pipe connection operations between the suck back valve 20 and the fluid pressure control device 18, as well as between the suck back valve 20 and the ON/OFF valve 26 are unnecessary, and a dedicated space for installation of the fluid pressure control device 18 and the ON/OFF valve 20 are unnecessary, enabling effective use of the installation space.

Further, according to the present embodiment, because the ON/OFF valve 26 and controller 32, etc., are formed integrally with the suck back mechanism 28, as compared to the conventional technique in which separately constructed elements are connected together, a small scale structure can be achieved.

Furthermore, in the present embodiment, because piping between the suck back valve 20 and a fluid pressure control device 18 is not needed, an increase in fluid passage resistance can be avoided. Notwithstanding, the pilot pressure can be adjusted with good accuracy in accordance with first and second electromagnetic valves 104 and 106 which are controlled electrically by the main control unit 108. As a result, it become possible to raise the response accuracy of the second diaphragm 80 operated in accordance with pilot pressure, wherein coating liquid remaining inside the fluid passage 38 can be swiftly sucked back.

What is claimed is:

1. A suck back valve comprising:
    a coupling having a fluid passage with a first port formed in one end, and a second port formed in another end thereof;
    a suck back mechanism for sucking a fluid inside said fluid passage under a negative pressure action of a flexible member displaced by a pilot pressure;
    an ON/OFF valve for opening and closing said fluid passage under an action of the same pilot pressure which is supplied to said suck back mechanism;
    a controller having a supply valve and a discharge valve for adjusting, by means of supply and exhaust actions, the pressure of the pilot pressure supplied respectively to the suck back mechanism and to the ON/OFF valve, wherein by respectively outputting electrical signals to the supply valve and the discharge, the supply valve and the discharge valve are energized and de-energized; and
    a fluid passage switching element disposed in said controller for switching the pilot pressure respectively between the suck back mechanism and the ON/OFF valve.

2. The suck back valve according to claim 1, said fluid passage switching element comprising a three-port electromagnetic valve, wherein by placing said three-port electromagnetic valve in an ON state, pilot pressure is supplied to a first pilot passage communicating with the ON/OFF valve, whereas by placing said three-port electromagnetic valve in an OFF state, the pilot pressure is supplied to a second pilot passage communicating with the suck back mechanism.

3. The suck back valve according to claim 2, wherein by placing said three-port electromagnetic valve in an ON state, pilot pressure is supplied to a cylinder chamber through said first pilot passage, and under action of said pilot pressure, a piston is caused to separate away from a seat opening said ON/OFF valve, whereas by placing said three-port electromagnetic valve in an OFF state, the pilot pressure is supplied to a diaphragm chamber through said second pilot passage, and under action of said pilot pressure, the flexible member is displaced toward said fluid passage.

4. The suck back valve according to claim 3, further comprising a pressurized fluid discharge port disposed in a bonnet of the controller, for discharging a pilot pressure remaining inside the diaphragm chamber by switching said three-port valve from an ON state to an OFF state when the supply valve is in an OFF state and the discharge valve is in an ON state.

5. The suck back valve according to claim 1, wherein said coupling, said suck back mechanism, said ON/OFF valve and said controller, respectively, are assembled integrally.

6. The suck back valve according to claim 1, wherein said supply valve and said discharge valve comprise respectively a first electromagnetic valve and a second electromagnetic valve.

7. The suck back valve according to claim 1, wherein said suck back mechanism comprises:
    a diaphragm displaceable under action of a pilot pressure supplied from a pressurized fluid supply port;
    a stem displaceably disposed in a valve body and displaceable in unison with said diaphragm;
    another diaphragm connected to an end of said stem and which effects a negative pressure action by displacement together with said stem; and
    a spring element for biasing said stem in a predetermined direction.

8. The suck back valve according to claim 1, further comprising a main control unit disposed in said controller for electrically controlling said supply valve, said exhaust valve and said fluid passage switching element.

* * * * *